United States Patent
Perrow

(10) Patent No.: US 7,022,021 B2
(45) Date of Patent: Apr. 4, 2006

(54) UNIVERSAL JOINT ROLLER ASSEMBLY

(75) Inventor: Scott Jay Perrow, Freeland, MI (US)

(73) Assignee: Delphi Technologies, Inc., Troy, MI (US)

(*) Notice: Subject to any disclaimer, the term of this patent is extended or adjusted under 35 U.S.C. 154(b) by 40 days.

(21) Appl. No.: 10/277,301

(22) Filed: Oct. 22, 2002

(65) Prior Publication Data

US 2004/0077412 A1 Apr. 22, 2004

(51) Int. Cl.
*F16D 3/205* (2006.01)

(52) U.S. Cl. .................. 464/111; 464/132; 464/905

(58) Field of Classification Search ............ 464/111, 464/130, 132, 905, 124; 384/572, 576–579
See application file for complete search history.

(56) References Cited

U.S. PATENT DOCUMENTS

| | | | |
|---|---|---|---|
| 2,010,050 A * | 8/1935 | Ackerman | 384/579 |
| 2,036,978 A * | 4/1936 | Anderson | 464/130 X |
| 3,818,721 A | 6/1974 | Wahlmark | |
| 4,512,750 A | 4/1985 | Orain | |
| 5,209,700 A * | 5/1993 | Bensinger et al. | 464/111 |
| 5,496,217 A | 3/1996 | Perrow et al. | |
| 5,501,533 A | 3/1996 | Williams et al. | |
| 5,591,085 A | 1/1997 | Stall et al. | |
| 5,658,199 A | 8/1997 | Ricks et al. | |
| 6,190,260 B1 | 2/2001 | Flores et al. | |
| 6,390,926 B1 | 5/2002 | Perrow | |
| 6,533,667 B1 * | 3/2003 | Perrow et al. | 464/111 |
| 6,699,134 B1 * | 3/2004 | Sams et al. | 464/111 |

FOREIGN PATENT DOCUMENTS

| | | | | |
|---|---|---|---|---|
| DE | 868 378 | 2/1953 | | |
| DE | 759 153 | 7/1953 | | |
| FR | 661409 | * 7/1929 | | 384/572 |
| FR | 2699620 | 6/1994 | | |
| GB | 222475 | * 9/1924 | | 384/572 |

* cited by examiner

*Primary Examiner*—Greg Binda
(74) *Attorney, Agent, or Firm*—Michael D. Smith

(57) ABSTRACT

A tripot universal joint has a plurality of roller assemblies mounted on trunnions of a drive shaft and run in longitudinal tracks of a housing. Each roller assembly includes a roller and a needle roller bearing for rotatably mounting the roller on a roller carrier. Each needle bearing includes a plurality of needle rollers and a cage. The cage has spaced end rings that are connected by a plurality of cross bars to retain the needle rollers with respect to the roller in the axial direction, and conformations that cooperate with the roller to retain the cage with respect to the roller in the axial direction.

8 Claims, 4 Drawing Sheets

US 7,022,021 B2

UNIVERSAL JOINT ROLLER ASSEMBLY

FIELD OF THE INVENTION

This invention relates generally to universal joints and more particularly to universal joints having drive rollers that rotate on needle roller bearings.

BACKGROUND OF THE INVENTION

U.S. Pat. No. 5,658,199 granted to Michael Ricks et al Aug. 19, 1997 discloses a tripot universal joint characterized by three roller assemblies that are supported on three equally spaced radial spider trunnions, respectively. Each roller assembly includes a roller carrier and an outer roller rotatably supported by a needle roller bearing on the roller carrier. Each outer roller is fixed with respect to its associated roller carrier in the radial direction by inner and outer snap rings that are mounted in grooves in the bore of the outer roller and that overlap the respective inner and outer end faces of the roller carrier. These snap rings also retain the needle rollers of the needle roller bearing in the longitudinal or axial direction.

It is also known to provide a tripot universal joint characterized by three roller assemblies that are supported on three respective equally spaced radial spider trunnions wherein each roller assembly includes an outer roller that moves in the longitudinal direction with respect to pivotally mounted roller carrier. The outer roller is rotatably supported on the roller carrier by a needle roller bearing. In this instance, the needle rollers are retained in the longitudinal or axial direction by a cup formed by integral shoulders of the outer roller that are located at the ends of the bore of the outer roller as shown in FIG. 1 of this patent application which is labeled "Prior Art".

The "prior art" design described above and shown in FIG. 1 is satisfactory from a functional standpoint. However, the cup of the outer roller is expensive to manufacture. An arrangement similar to that shown in the Ricks '199 patent, using two snap rings on the outer roller instead of integral shoulders is a possible alternative to the "cup". However, this alternative requires outer rollers that are wider to accommodate the retaining grooves for the snap rings. The wider rollers in turn increase the housing diameter resulting in a larger package size and mass.

SUMMARY OF THE INVENTION

This invention provides a universal joint roller assembly wherein an outer roller is rotatably by a needle roller bearing. The needle roller bearing includes a needle bearing cage comprising spaced end rings that are connected by a plurality of cross bars. The cross bars cooperate with the end rings to provide pockets, each holding a plurality of needle rollers side-by-side that are retained in the longitudinal or axial direction by the end rings. The cage has conformations that retain the cage and thus the needle roller with respect to the outer rollers in the longitudinal or axial direction. The cage may also have a confirmation for limitive longitudinal displacement of the outer roller.

DETAILED DESCRIPTION OF PREFERRED EMBODIMENTS

Figure 1:
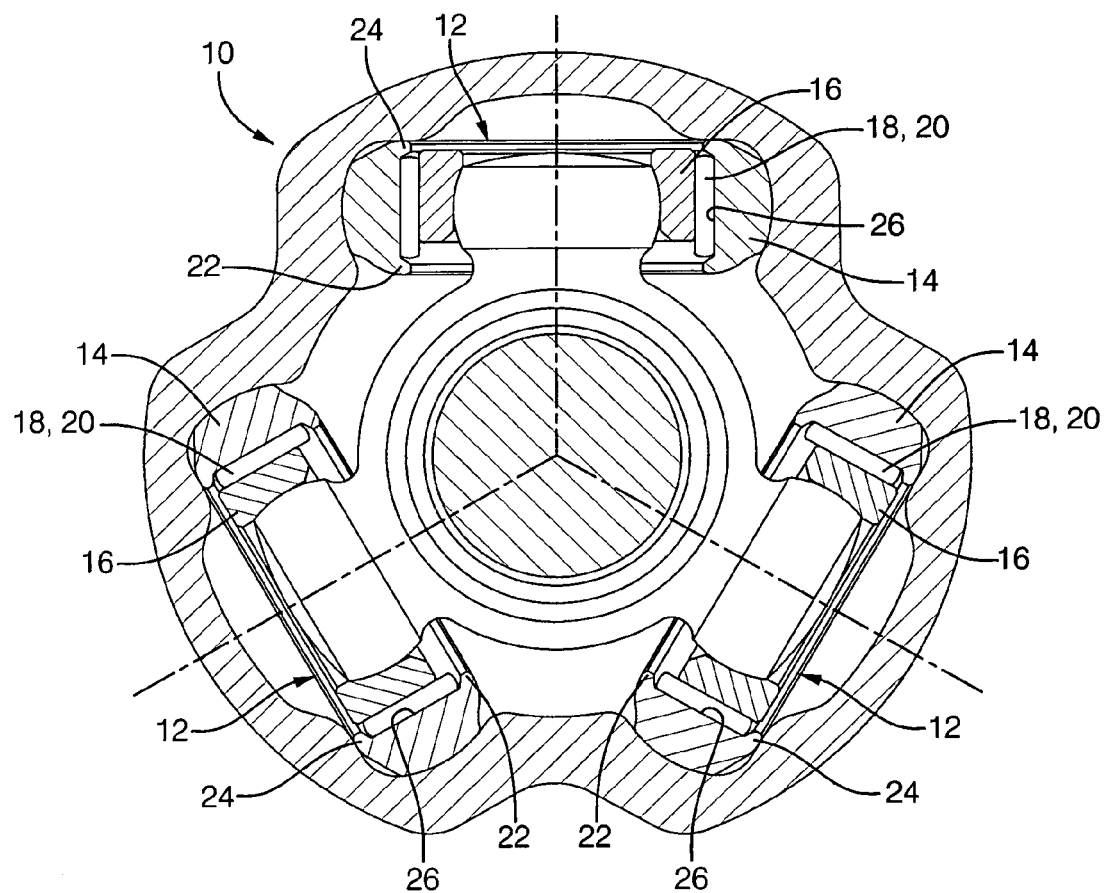
FIG. 1 is an end view of a prior art tripot universal joint having known roller assemblies. Each known roller assembly includes an outer roller rotatably supported on a roller carrier by a needle roller bearing. Each needle roller bearing comprises a full complement of needle rollers that are retained in the longitudinal direction with respect to the outer roller by a cup formed by integral annular shoulders at the ends of the bore of the outer roller.

Referring now to FIG. 1, there is shown an end view of a "prior art" tripot universal joint 10 (also known as a tripod joint) having three known roller assemblies 12. Each known roller assembly 12 includes an outer roller 14 rotatably supported on a roller carrier 16 by a needle roller bearing indicated generally at 18. Each needle roller bearing 18 comprises a full complement of needle rollers 20 that run directly on the inner and the outer cylindrical surfaces of the outer roller 14 and roller carrier 16 respectively which serve as the inner and outer bearing races. Needle rollers 20 are retained with respect to the outer roller 14 in the longitudinal or axial direction by integral inner and outer annular shoulders 22 and 24 at the opposite axial ends of the inner cylindrical surface 26 of the outer roller 14. As indicated above in the background of the invention, the outer rollers 14 are expensive to manufacture.

Figure 2:
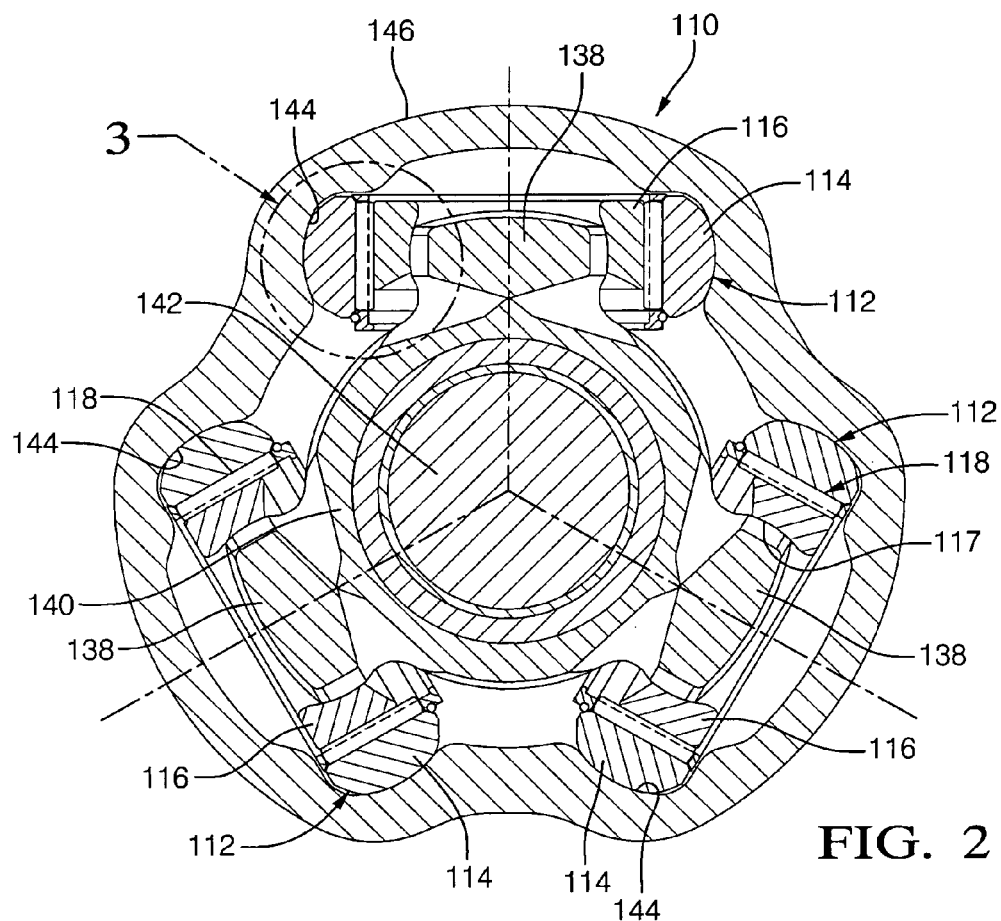
FIG. 2 is an end view of a tripot universal joint having roller assemblies in accordance with a first embodiment of the invention.
Figure 3:
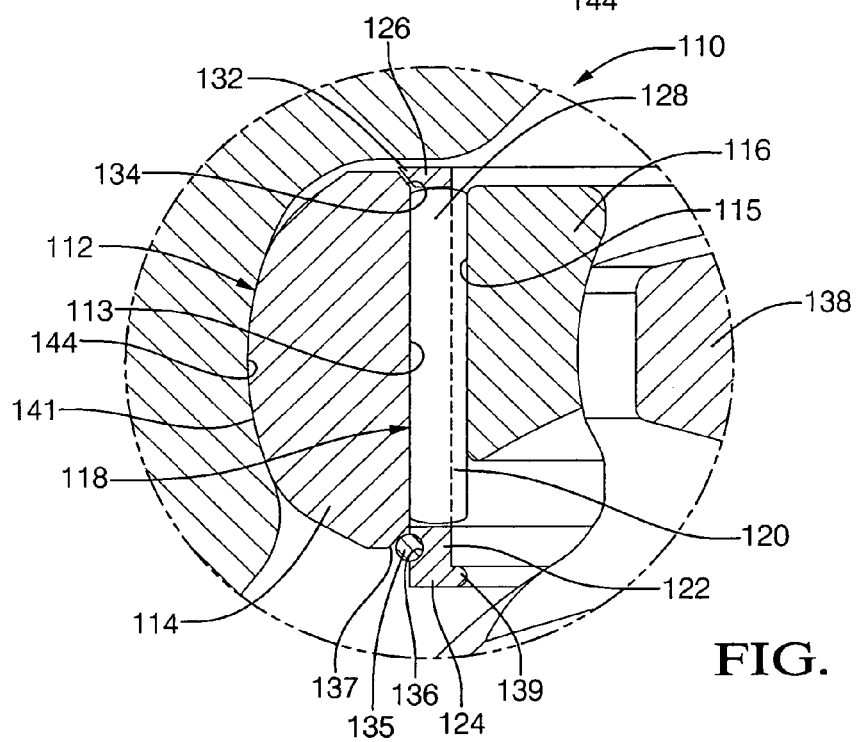
FIG. 3 is an enlarged fragmentary end view of the tripot universal joint shown in FIG. 2.
Figure 4:
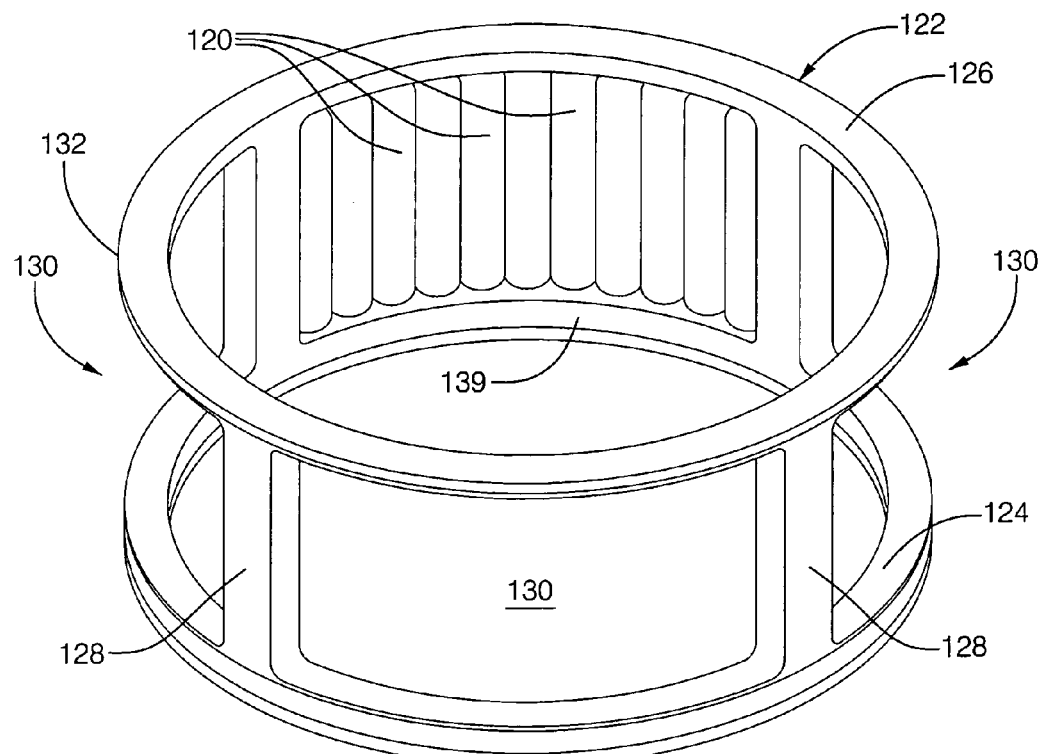
FIG. 4 is a perspective view of the cage that is part of each of the roller assemblies shown in FIGS. 2 and 3.

Referring now to FIGS. 2, 3 and 4, there is shown a first embodiment of a tripot universal joint 110 (also known as a tripod joint) having roller assemblies in accordance with the invention. Tripot joint 110 has three such roller assemblies 112. Each roller assembly 112 includes an outer roller 114 rotatably supported on a roller carrier 116 by a needle roller bearing indicated generally at 118. Each needle roller bearing 118 comprises a plurality of needle rollers 120 and a cage 122. Needle rollers 120 run directly on the inner and the outer cylindrical surfaces 113, 115 of the associated outer roller 114 and roller carrier 116 respectively which serve as the inner and outer bearing races. As shown best in FIGS. 2 and 3, roller carrier 116 has an inner annular wall surface 117 that is concavely shaped in the axial direction of the roller carrier 116 and engages an associated spherical trunnion 138 of a spider 140 to provide a pivotal connection therebetween. Cage 122 is a plastic molded type cage that comprises spaced end rings 124 and 126 that are connected by a plurality of cross bars 128 to form a plurality of roller receiving windows 130 as best shown in FIG. 4. The number of cross bars 128 is preferably minimal (four in this particular embodiment) so that each window 130 holds several needle rollers 120 side-by-side while end rings 124 and 126 retain these several needle rollers 120 in the longitudinal or axial direction.

The needle rollers 120 are retained with respect to the outer roller 114 in the longitudinal or axial direction by conformations on cage 122 that cooperate with the associated outer roller 114 to retain the cage with respect to the associated outer roller 114 in the longitudinal or axial direction. As such, the cage 122 and needle rollers 120 are substantially fixed axially relative to the outer roller 114. In this particular embodiment, the conformations take the form of an outer diameter flange 132 on end ring 126 that cooperates with a chamfer 134 at one end of outer roller 114 and a separate retaining ring 135 that snap-fits into an annular groove 136 in end ring 124 and that cooperates with a chamfer 137 at the opposite end of outer roller 114. Cage 122 is assembled through roller 124 until flange engages chamfer 134. Retaining ring 135 is then snapped into groove 136 to prevent disassembly.

Cage 122 also preferably includes an inner diameter flange 139 on end ring 124 to limit the longitudinal outward displacement of outer roller 114 with respect to roller carrier 116 so that outer roller 114 can move outwardly of roller carrier 116 but cannot separate from roller carrier 116. Inward movement of outer roller 114 with respect to roller carrier 116 is limited by spider 140 which is described below. The inner surface 113 of the outer roller 114 and that of the needle bearings 120 is greater than the axial length of the outer surface 115 of the inner roller carrier 116, enabling the axial displacement of the outer roller 114, cage 122 and needle rollers 120 relative to the inner roller carrier 116.

Tripot or tripod universal joints are well known and need not be described in detail. Suffice it to state that the three roller assemblies 112 are pivotally mounted on the three spherical trunnions 138, respectively of the spider 140 that is attached to a drive shaft 142. The three roller assemblies 112 in turn run in three longitudinal grooves or tracks 144, respectively of a housing 146. Outer convex surfaces 141 of the outer rollers 114 engage associated concave surfaces of the tracks 144, as shown best in FIG. 3.

Figure 5:
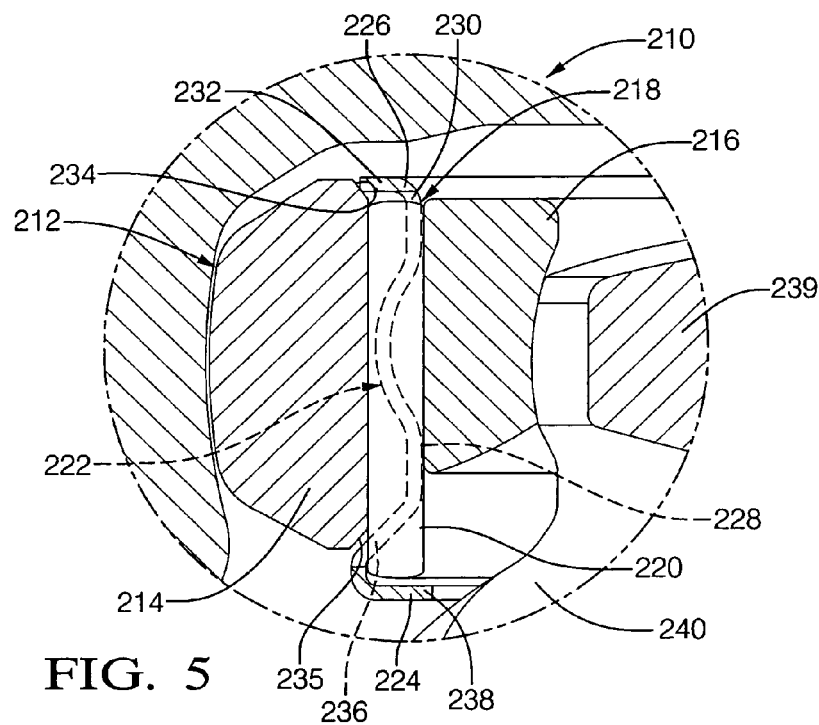
FIG. 5 is an enlarged fragmentary end view of a tripot universal joint having roller assemblies in accordance with a second embodiment of the invention.
Figure 6:
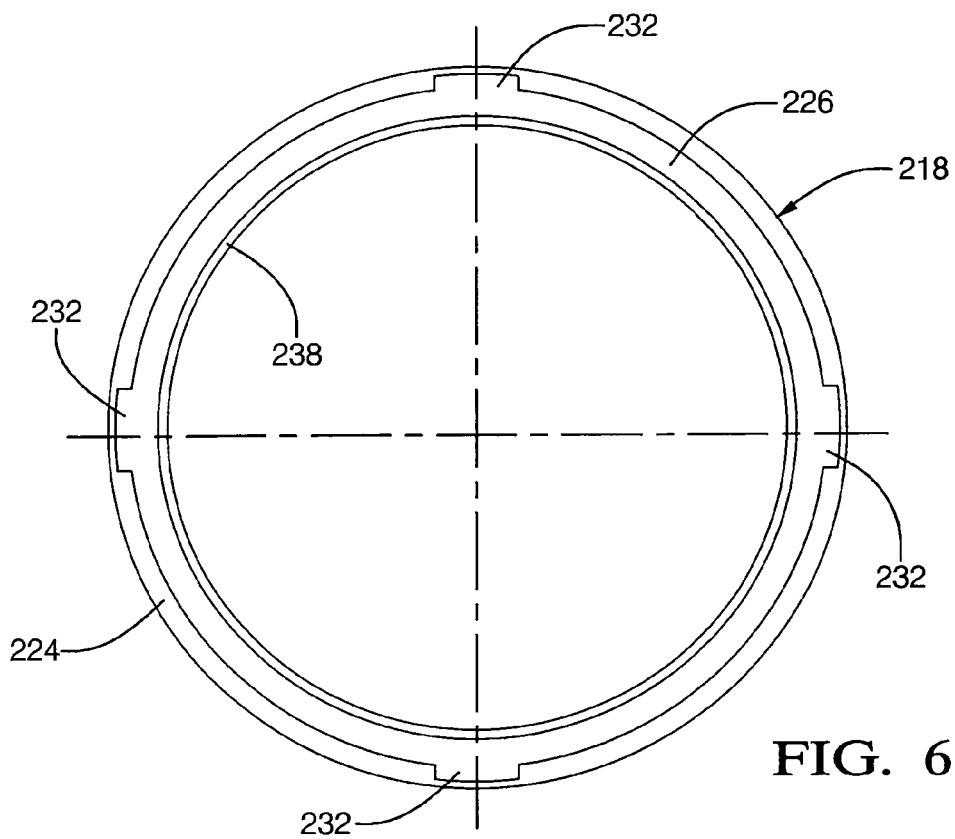
FIG. 6 is a section taken substantially along the line 6—6 of FIG. 5 looking in the direction of the arrows.

A second embodiment of the invention is shown in FIGS. 5 and 6. Here, tripot universal joint 210 has three roller assemblies 212. Each roller assembly 212 includes an outer roller 214 rotatably supported on a roller carrier 216 by a needle roller bearing indicated generally at 218. Each needle roller bearing 218 comprises a plurality of needle rollers 220 and a cage 222. Needle rollers 220 run directly on the inner and the outer cylindrical surfaces of the associated outer roller 214 and roller carrier 216 respectively which serve as the inner and outer bearing races.

Cage 222 is a stamped sheet metal type cage that comprises spaced end rings 224 and 226 that are connected by a plurality of cross bars 228 to form a plurality of roller receiving windows 230. The number of cross bars 228 is preferably minimal as in the case of the first embodiment so that each window 230 holds several needle rollers 220 side-by-side while end rings 224 and 226 retain these several needle rollers 220 in the longitudinal or axial direction.

The needle rollers 220 are retained with respect to the outer roller 214 in the longitudinal or axial direction by conformations on cage 222 that cooperate with the associated outer roller 214 to retain the cage with respect to the associated outer roller 214 in the longitudinal or axial direction. In this particular embodiment, the conformations take the form of a plurality of circumferentially spaced, flexible radial tabs 232 on end ring 226 that cooperates with a chamfer 234 at one end of outer roller 214 and projecting portions 236 at the ends of cross bars 228 near end ring 224 that cooperate with a chamfer 235 at the opposite end of outer roller 214. Cage 222 is assembled into roller 224 (from the bottom as shown in FIG. 5) depressing tabs 232 until cross bar portions 236 engage chamfer 236 and tabs 232 spring out adjacent chamfer 235.

Cage 222 also preferably includes an inner diameter extension flange 238 of end ring 224 to limit the longitudinal outward displacement of the outer roller 214 with respect to the roller carrier 216 while inward displacement is limited by spider 240 once roller assembly 212 is attached to an associated trunnion 239.

Figure 7:
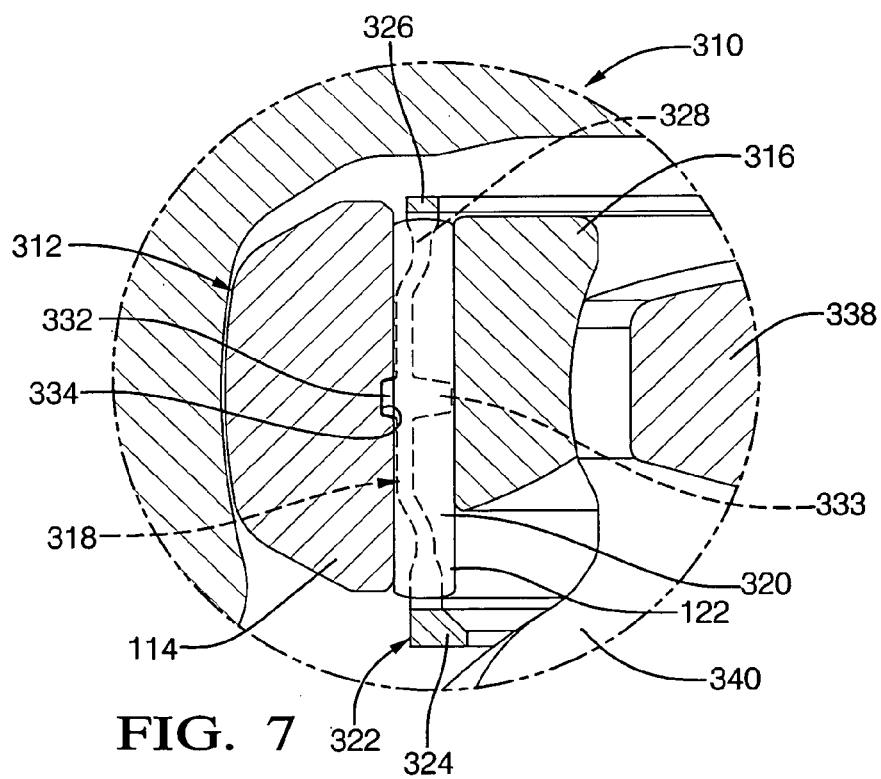
FIG. 7 is an enlarged fragmentary end view of a tripot universal joint having roller assemblies in accordance with a third embodiment of the invention.

A third embodiment of the invention is shown in FIG. 7. Here tripot universal joint 310 has three roller assemblies 312. Each roller assembly 312 includes an outer roller 314 rotatably supported on a roller carrier 316 by a needle roller bearing indicated generally at 318. Each needle roller bearing 318 comprises a plurality of needle rollers 320 and a cage 322. Needle rollers 320 run directly on the inner and the outer cylindrical surfaces of the associated outer roller 314 and roller carrier 316 respectively which serve as the inner and outer bearing races. Cage 322 is a plastic molded type cage that comprises spaced end rings 324 and 326 that are connected by a plurality of flexible cross bars 328 to form a plurality of roller receiving pockets 330. As in the case of the first and second embodiments, the number of cross bars 328 is preferably minimal so that each pocket 330 holds several needle rollers 320 side-by-side while end rings 324 and 326 retain these several rollers 320 in the longitudinal or axial direction.

The needle rollers 320 are retained with respect to the outer roller 314 in the longitudinal or axial direction by conformations on cage 322 that cooperate with the associated outer roller 314 to retain the cage with respect to the associated outer roller 314 in the longitudinal or axial direction. In this particular embodiment, the conformations take the form of a radial outward projecting rib 332 and an inwardly projecting rib 333 in the middle of each cross bar 328 which is flexible. Cage 322 is assembled into outer roller 314 depressing the flexible cross bars 328 until the depressed cross bars 328 push ribs 332 into a circumferential slot 334 in the cylindrical inner surface of outer roller 314. Ribs 332 are held in slot 334 by the resilience of cross bars 324 until roller carrier 316 is assembled. Ribs 332 are then retained in slot 334 by inner ribs 333 engaging roller carrier 316. Cage 322 also preferably includes an inner diameter flange 336 to limit the longitudinal displacement of the outer roller 314 with respect to roller carrier 316 while inward displacement is limited by spider 340 once roller assembly 312 is attached to an associated trunnion 338.

While the embodiments of the invention have been described in connection with a particular type of tripot universal joint, the invention is applicable to any type of universal joint in which a roller is rotatably mounted by a needle bearing, particularly a roller that also slides longitudinally with respect to a roller support, such as an inner roller carrier or trunnion. In other words, the invention may be practiced other than as the specifically described preferred embodiments, without departing from the spirit and scope of the invention.

I claim:

1. A roller assembly for a universal joint having a plurality of roller assemblies that are rotatably mounted on respective roller supports of a spider that is attached to a drive shaft and that run in respective longitudinal grooves or tracks of a housing, the roller assembly comprising:

a roller and a needle roller bearing for rotatably mounting the roller on the roller support, the needle roller bearing including a plurality of needle rollers and a cage, the cage having spaced end rings that are connected by a plurality of cross bars to form a plurality of roller pockets that receive the needle rollers and retain the needle rollers with respect to the roller in the longitudinal or axial direction, and the cage having an outer diameter flange on one end ring that cooperates with one end of the roller and a separate snap ring carried by the other end ring that cooperates with an opposite end of the roller, and including an annular recess formed in said other end ring in which the snap ring is installed.

2. A roller assembly for a universal joint comprising:

an inner roller support having an inner annular wall that is concavely shaped in an axial direction of the inner roller support and having an outer cylindrical surface of predetermined axial length;

an outer roller disposed about the inner roller support and having an inner cylindrical surface having an axial length greater than that of the outer surface of the inner roller support;

a needle roller bearing for rotatably mounting the outer roller on the roller support, the needle roller bearing including a plurality of needle rollers and a cage, the cage having spaced end rings that are connected by a plurality of cross bars to form a plurality of roller windows that receive the needle rollers and retain the needle rollers with respect to the outer roller in the axial direction, the cage having first conformations that cooperate with the outer roller and the cage having a second conformation that cooperates with the roller support to permit limited axial displacement of the outer roller, cage and needle rollers with respect to the inner roller support.

3. The roller assembly as defined in claim 2 wherein the second conformation comprises an inner diameter flange on one end ring that cooperates with the roller support to limit outward longitudinal displacement of the roller with respect to the roller support.

4. The roller assembly as defined in claim 3 wherein, the first conformations comprise an outer diameter flange on one end ring that cooperates with one end of the roller and a separate retaining ring carried by another end ring that cooperates with an opposite end of the roller.

5. The roller assembly as defined in claim 3 wherein the first conformations comprise a plurality of circumferentially spaced, flexible radial tabs on one end ring that cooperates with one end of the roller and projecting portions at ends of the cross bars near another end ring that cooperate with an opposite end of the roller.

6. The roller assembly as defined in claim 3 wherein the cross bars are flexible and the first conformations comprise a radial outward projecting rib in the middle of each cross bar that projects into a circumferential slot in an inner cylindrical surface of the roller.

7. The roller assembly as defined in claim 6 wherein each cross bar has a radial inward projecting rib that engages the roller support to retain an associated radial outward projecting rib in the circumferential slot.

8. A roller assembly, comprising:

an inner roller carrier having a concave inner surface pivotally engageable with a spherical trunnion of a spider of a joint;

an outer roller disposed about said inner roller carrier and having a convex outer surface;

a plurality of needle bearings disposed between said inner roller carrier and said outer roller; and a cage disposed between said inner roller carrier and said outer roller capturing said needle bearings against axial separation from said inner roller carrier and said outer roller and including end retainers engaging axial ends of said outer roller to secure said cage and said needle bearings against substantial axial movement relative to said outer roller while enabling said outer roller, needle bearings and cage to move axially relative to said inner roller carrier.

* * * * *